United States Patent [19]

Yajima

[11] Patent Number: 4,794,017

[45] Date of Patent: Dec. 27, 1988

[54] SOYBEAN PROCESSED FOOD

[75] Inventor: Mizuo Yajima, Tokyo, Japan

[73] Assignee: Asama Chemical Co., Ltd., Tokyo, Japan

[21] Appl. No.: 921,457

[22] Filed: Oct. 22, 1986

[30] Foreign Application Priority Data

Sep. 19, 1986 [JP] Japan .................. 61-219146

[51] Int. Cl.$^4$ .......................... A23L 1/20; A23L 1/00; A23J 1/00
[52] U.S. Cl. .................................... 426/634; 426/104; 426/802
[58] Field of Search ............... 426/601, 634, 442, 800, 426/801, 104, 802

[56] References Cited

FOREIGN PATENT DOCUMENTS 138351 10/1982 Japan ..................................... 426/634

Primary Examiner—Barry S. Richman
Assistant Examiner—Lyle Alfandary-Alexander
Attorney, Agent, or Firm—Birch, Stewart, Kolasch & Birch

[57] ABSTRACT

A processed food of soybean comprises soybean or a processed soybean and a fish oil containing a highly unsaturated fatty acid, such as sardine oil, cod liver oil, mackerel oil, salmon oil and saury oil.

7 Claims, No Drawings

SOYBEAN PROCESSED FOOD

The present invention relates to a soybean processed food and more particularly to a soybean processed food which is improved in the smell of soybean and the taste by the addition of fish oil containing a high percentage of polyvalent unsaturated fatty acids.

Soybean processed food has been proposed, wherein vegetable fats and oils are added to a soybean processed fibrous or granular goods, in Japanese patent publication A (unexamined) No. 207 552/85.

In the soybean processed food, however, grassy-smell which is peculiar to soybeans, the so-called soybean smell, still remains. Further, it has a simple taste and falls short of having the so-called "body".

SUMMARY OF THE INVENTION

In order to provide a soybean processed food which is an improvement over the above-described drawbacks, the present inventor has made intensive studies. As a result, the present inventor has discovered that the soybean smell is removed and good "body" is given by the addition of fish oil containing a high percentage of polyvalent unsaturated fatty acids to a soybean processed fibrous, flaked or powdered goods obtained from soybeans or de-fatted soybeans, and attained by the present invention.

Therefore, the present invention relates to a soybean processed food comprising soybeans or soybean processed goods and fish oil containing a high percentage of polyvalent unsaturated fatty acids.

A processed food of soybean is defined as comprising soybean or a processed soybean and a fish oil containing a highly unsaturated fatty acid.

The soybean processed goods used in the present invention are any soybean processed goods which are in the form of fibers, flakes, powder or grains which is obtained by grinding soybeans or de-fatted soybeans. Soybean processed goods in the form of fibers (soybean processed fibrous goods) are preferably used and are prepared, for example, by the process described in published examined Japanese patent application No. 9099/81.

In order to practice the process, soybeans or de-fatted soybeans are soaked in water to increase the weight thereof by 30 to 60% caused by the water absorbed. The resultant soaked soybeans or de-fatted soybeans are then heated by a means of a short-time cooking treatment or the like to inactivate any harmful enzymes such as trypsin inhibitor, lipoxygenase, and the like which are then passed through a gap (usually 0.02 to 0.2 mm) between two grinding plates rotating at high speeds and thereby become grounded. The soybean processed fibrous goods thus obtained or dry goods obtained therefrom are preferably used as the soybean processed goods in the form of fibers.

Soybeans may be used as such. However, it is preferable that soybeans are soaked with water and heated by a cooking treatment or the like.

The fish oil containing a high percentage of polyvalent unsaturated fatty acids used in the present invention is any fish oil which contains large quantities of unsaturated fatty acids such as eicosapentaenoic acid and docosahexaenoic acid or any acids which would constitute as unsaturated fatty acids. Examples of the above fish oils include sardine oil, cod-liver oil, mackerel oil, salmon oil, saury oil, etc. The so-called soybean smell is removed and good "body" is provided to the soybean processed food by the inclusion of fish oil containing a high percentage of polyvalent unsaturated fatty acids in the soybean processed food. Further, polyvalent unsaturated fatty acids, which are not contained in the fatty acids which constitute vegetable oil in soybeans, can be contained in the soybean processed food by the inclusion of the aforesaid fish oil in the soybean processed food. Therefore, it is possible to provide soybean processed food which are excellent in nutrition and having physiological activation effects such as inhibitory action on thrombosis.

The fish oil containing a high percentage of polyvalent unsaturated fatty acids which can be used in the present invention is any fish which is collected and refined by a conventional method. The preferred fish oil is produced by the following method. Fats and oils extracted from a fish body or the liver of a fish by boiling are refined by a wax-removal process, a deoxidation process and, if necessary, a bleaching process. The refined fats and oils are concentrated by the wintering method to concentrate the polyvalent unsaturated fatty acids to a content of about 15 to 45%, followed by deodorizing by a vacuum steam-distillation.

In the soybean processed food of the present invention, 0.1 to 5 parts by weight of the above refined fish oil containing a high percentage of polyvalent unsaturated fatty acids are used per part by weight of soybeans or a soybean processed dry goods. With less than 0.1 part by weight of the refined fish oil, the soybean smell remains in the soybean processed food and with more than 5 parts by weight, the soybean processed food becomes too thick.

It is known that in general, that the unsaturated bonds of fatty acids which constitutes fish oil is easily oxidized and develops acidification at the time of processing and during storage, and in an extreme case, proceeds to the so-called rancidity stage in which it has an acid taste and a puckery taste and is colored. In the present invention, since fish oil having polyvalent unsaturated bonds is used together with the soybean processed goods, the oxidation of the fish oil containing a high percentage of polyvalent unsaturated fatty acids is inhibited by the inhibiting actions of vitamin E, proteins and phospholipids such as lecithin in soybean constituents, thus preventing the occurrence of acidification.

The soybean processed food of the present invention is manufactured by seasoning soybeans or a soybean processed goods, in which the water content thereof has been adjusted, followed by mixing the seasoned product with fish oil containing a high percentage of polyvalent unsaturated fatty acids. The soybeans or soybean processed goods may be mixed with other foods such as meats cooked and processed with fish oil containing a high percentage of polyvalent unsaturated fatty acids.

The soybean processed food thus obtained is properly mixed with seasonings, spices, flavors, coloring agents, etc. and further mixed with fish or meats. The resultant soybean processed food is packed in a can, a retort pouch or the like, which is used as a material for various dishes, such as a material for a salad, a filling for a sandwich, etc.

The present invention will be described in detail hereinafter by way of the following examples.

EXAMPLE 1 AND COMPARATIVE EXAMPLE 1

1,000 g of soybean processed fibrous dry goods (manufactured by Kyokusho Shokuhin Co., Ltd.) is reconstituted with 1,600 g of water, which is then added and mixed with 1,000 g of beef-cooked gravy, 100 g of beef seasoning (manufactured by Takeda Chemical Industries, Ltd., No. 1), 40 g of beef extract (manufactured by Hasegawa Koryo Co., Ltd., No. 660), 160 g of sodium glutamate, 1 g of Ribotaido ® (manufactured by Takeda Chemical Industries, Ltd.), 20 g of sodium chloride, 100 g of albumen, 10 g of agar, 20 g of powdered garlic, 20 g of powdered white pepper, 20 g of powdered onion, 22 g of monascus coloring matter and 300 g of refined sardine oil (manufactured by Asama Chemical Co., Ltd., Asama EPA-18) to manufacture a soybean processed food having a flavor of corn beef. The soybean processed food thus manufactured is packed in empty cans, sealed hermetically by vacuum seaming and sterilized using a retort sterilizer for 10 minutes at 120° C. to obtain cans packed with the soybean processed food. The cans thus obtained are opened after the manufacture and after the storage for 6 months at 40° C. to carry out organoleptic tests.

By way of comparison, a canned soybean processed food is manufactured using corn salad oil instead of the refined sardine oil. After the manufacture, an organoleptic test is carried out in a similar manner as in Example 1.

The canned soybean processed food of Example 1 opened after the manufacture had no soybean smell and is full of "body" similar to corn beef. The canned soybean processed food of Comparative Example 1, however, had a smell of soybean and a simple taste. Further, the canned soybean processed food of Example 1 opened after the storage for 6 months had no oxidizing smell of fish oil.

EXAMPLE 2

1,000 g of soybean processed goods in the form of flakes (manufactured by Kyokusho Shokuhin Co., Ltd.) was reconstituted with 1,600 g of water, which was then added and mixed with 500 g of canned salmon flake water-boiled goods, 44 g of salmon flavor, 10 g of sodium glutamate, 1 g of Ribotaido, 60 g of sodium chloride, 60 g of gelatin and 20 g of monascus coloring matter. The resultant mixture is added and mixed with 890 g of refined salmon oil (manufactured by Osaka Seiyusho) to manufacture a soybean processed food having a flavor of salmon. The soybean processed food thus obtained is put up in cans in a similar manner as in Example 1.

The soybean processed food had no soybean smell and is excellent both in flavor and taste.

EXAMPLE 3

800 g of soybean processed fibrous goods (manufactured by Kyokusho Shokuhin Co., Ltd.) is reconstituted with 1,200 g of water, which is then added and mixed with 2,230 g of cooked chicken white meat flakes, 16 g of sodium glutamate, 1 g of Ribotaido, 50 g of gelatin, 40 g of powdered ginger, 8 g of powdered white pepper and 8 g of powdered onion. The resultant mixture is added and mixed with 700 g of refined sardine oil and 200 g of corn salad oil to manufacture a soybean processed food having a flavor of chicken white meat. The soybean processed food thus manufactured is packed in empty cans and treated in a similar manner as in Example 1 to obtain cans packed with the soybean processed food.

The soybean processed food also is excellent both in flavor and taste.

EXAMPLE 4

500 g of roughly-cut tomato peeled with hot water, 800 g of bouillon and a leaf of laurel tree are added to 100 g of bacon, 600 g of pork (shoulder) and 600 g of onion each cut into pieces 1 cm square followed by boiling until the pork became soft, which is then added with 600 g of boiled soybeans, 10 g of sodium chloride, 3 g of pepper and 100 g of tomato catsup. After boiling well until there is no soup present, 70 g of refined sardine oil is blended into to manufacture pork beans.

What is claimed is:

1. A processed food comprising soybean or a processed soybean and 0.1 to 5 parts by weight of a fish oil containing a highly unsaturated fatty acid, per part by weight of said soybean or processed soybean.

2. The processed food of claim 1, in which the highly unsaturated fatty acid is eicosapentaenoic acid or docosahexaenoic acid.

3. The processed food of claim 1, in which said fish oil is sardine oil, cod liver oil, mackerel oil, salmon oil or saury oil.

4. The processed food of claim 1, in which said fish oil contains from about 15 to 45 percent by weight of the highly unsaturated fatty acid.

5. The processed food of claim 1, in which said processed food is in the form of fibers, flakes, granules or powder.

6. The processed food of claim 1, further comprising at least one agent for seasoning, spicing, flavoring or coloring.

7. The processed food of claim 6, comprising animal protein materials.

* * * * *